June 2, 1931.    C. B. WOODWORTH    1,808,278
AUTOMOBILE TIRE
Filed March 8, 1927    2 Sheets-Sheet 1

INVENTOR
CHARLES B. WOODWORTH
BY Philip S. Hopkins
ATTORNEY

Patented June 2, 1931

1,808,278

UNITED STATES PATENT OFFICE

CHARLES B. WOODWORTH, OF PORT DICKINSON, NEW YORK

AUTOMOBILE TIRE

Application filed March 8, 1927. Serial No. 173,727.

Many efforts have been made in years past to provide a pneumatic tire which in addition to a long wearing quality is possessed with shock absorbing means to render the tire "easy riding." The last development along this line, the "balloon" tire, accomplished this purpose to a certain degree by making possible a large volume of the air at a low pressure, resulting in a definite cushioning effect of the tire with respect to obstructions with which it came in contact. Naturally, a large volume of air at a low pressure will permit considerable displacement of air within the tire without appreciably affecting the wheel upon which the tire is mounted.

It has been found by actual experience, however, that even with the "balloon" type of tire, a considerable amount of pressure is necessary in order to realize the lasting qualities of the tire to a degree consistent with the price at which they can be manufactured and sold. Naturally, the greater the pressure within the tire, the less opportunity for displacement, and the more readily a given obstruction over which the tire passes will affect the wheel upon which the tire is mounted.

Another disadvantage, so far as the shock absorbing qualities of the ordinary tire are concerned, lies in the fact that the air chamber within the tire is substantially uniform in shape about the tire, extending from the rim on which it is mounted, to the inner surface of the tire fabric. The result of this is that when the tire strikes an obstruction, there occurs a displacement of the tire not only at the point at which the obstruction engages, but for a considerable area on either side thereof due to the inelasticity of the tire walls and tread. Consequently, a greater amount of air is displaced, the result of which is to hasten the reaching of the maximum amount of displacement which the tire will stand before the effect of the obstruction is communicated to the wheel.

By my invention, I have provided a pneumatic tire particularly adaptable for automobiles and other heavy vehicles in which the air displacement caused by obstructions over which the tire travels is distributed over a maximum area with a minimum amount of displacement of the tire itself adjacent the point of contact with the obstruction. In other words, with my invention, an obstruction will affect the tire only at the point at which it actually comes in contact therewith, thus leaving within the tire a greater area for the displacement of the air due to such obstruction, and likewise preventing the displacement of a large area of the tire walls, thereby greatly reducing the "lifting" effect of the obstruction.

More specifically, my invention comprises a tire, the casing of which is provided with a series of air pockets of a depth approximately one-half that of the tire, all opening into and communicating with the air chamber extending around the tire between the rim and the inner edges of the pockets.

Another object is to provide a means for forming and maintaining this pocket formation within the casing of the tire.

A still further object is to provide the outer periphery of the tire with individual tread members, one to each pocket, which lend to the tire a size and shape on its outer side substantially the same as the well-known tires on the market today.

This pocket arrangement and the individual treads therefor result in a tire composed of a series of contiguous individual cushions, each one an air chamber or pocket opening into and communicating directly with the main air chamber within the tire.

Other objects and advantages in details of construction and operation will be apparent, as the description proceeds, reference now being had to the figures of the accompanying drawings wherein like reference numerals indicate like parts.

Figure 3:
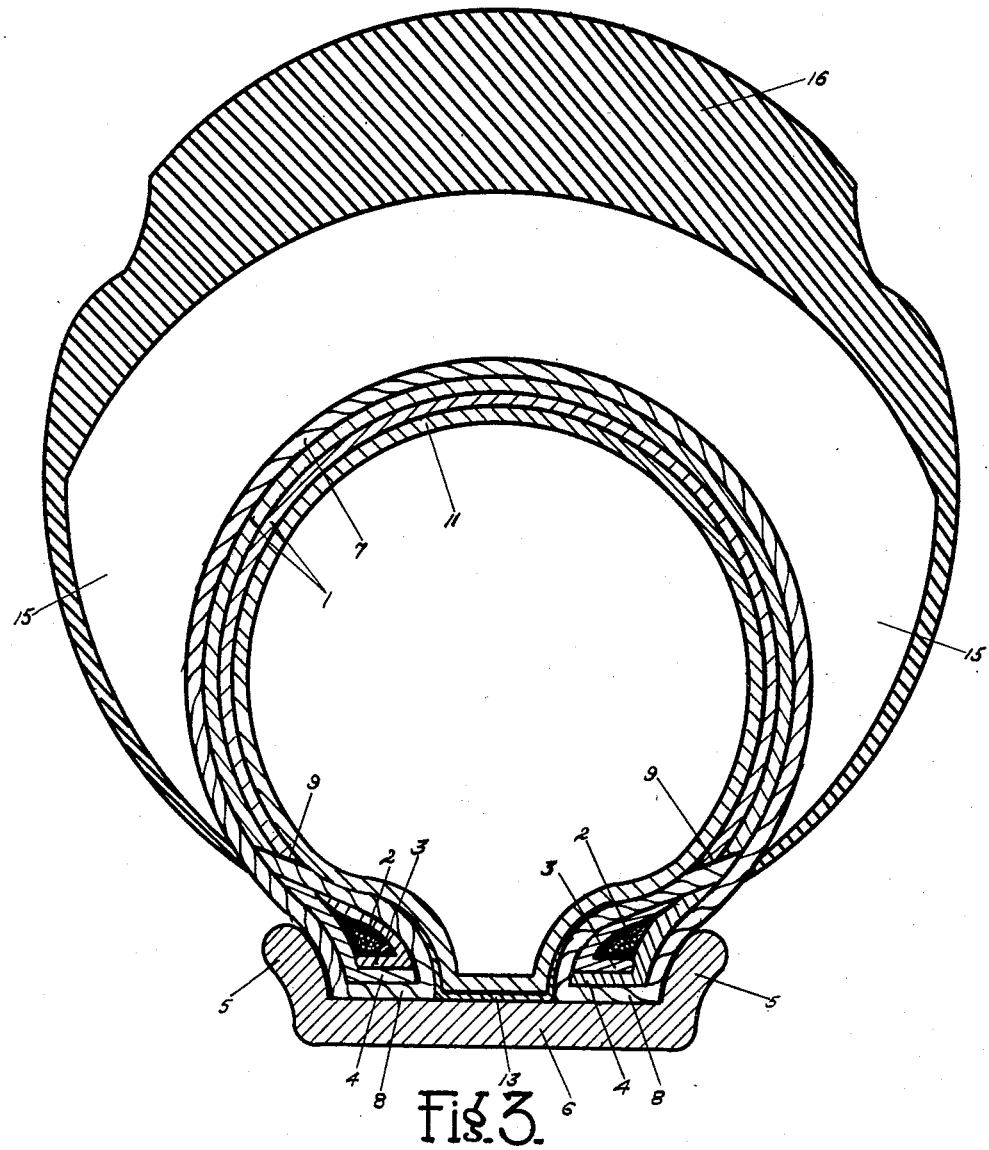
Figure 3 is an enlarged detail cross section taken on the line 3—3 of Figure 1.

The reference numeral 1 refers to the fabric walls of a tire casing which may be any ply desired, in the instance shown, there being two layers of fabric superimposed one upon the other. The particular construction of this fabric material may be any desired or necessary design and form, and comprises no part of this invention. The side walls of this fabric extend downwardly and are suitably secured around the bead cables 2 as shown clearly in Figure 3. In this instance, the free edges 3 of the inner layer of fabric are turned about the beads 2 from the inside and the free edges 4 of the outer layers of fabric are turned about the beads from the outside. Of course, in actual manufacture, it might prove desirable or necessary to add additional wrappings of fabric about the beads 2 in order to provide the desired size and shape thereof, the whole being vulcanized together in the usual manner to provide the usual beads on the tire for fitting within the upturned edges 5 of the tire rim 6.

At spaced intervals about this fabric casing, are secured cords 7, the free ends of which are passed around the beads as at 8 and then preferably through the fabric layers as at 9 whereby they are securely fastened to the beads.

The result of fastening these cords 7 about the fabric tire wall is to draw such fabric at spaced intervals toward the center thus providing a series of pockets 10 about the circumference of the tire in circumferential succession, that is, one following the other, as distinguished from side by side arrangement. Obviously then, when the rubber "inner tube" 11 is inserted within the tire casing and filled with air through the usual air valve 12, the air will force the inner tube outwardly against the walls of the fabric and will conform to the shape thereof, following the pocket formation provided by the cords 7. There is of course provided the usual protecting flap 13 between the rim 6 and the inner wall of the tire in order that the inner tube 11 will not engage directly with the rim 6.

Figure 1:
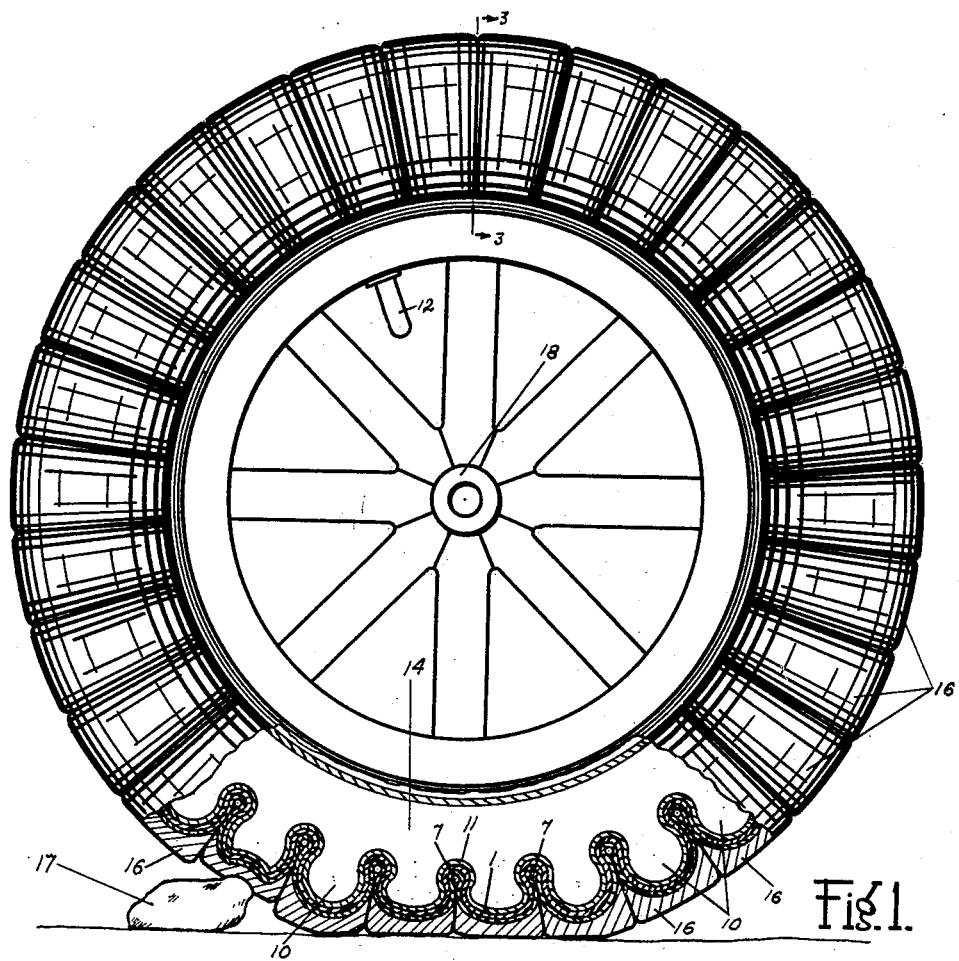
Figure 1 is a side view of an automobile wheel equipped with my improved tire, a portion being broken away for clearness of illustration.
Figure 2:
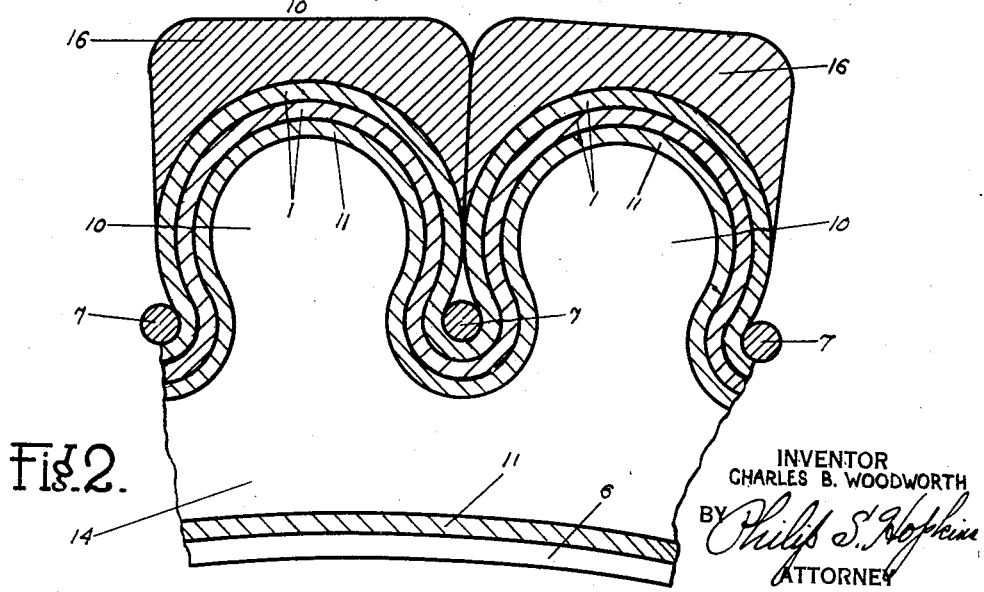
Figure 2 is an enlarged detail cross sectional view through a portion of my tire illustrating clearly the air pocket arrangement.

It will be noted with reference to Figures 1 and 2 particularly that the cords 7 draw the fabric 1 inwardly to a point about midway between the free edges of the fabric forming the beads and the upper wall of the fabric. This leaves a large air chamber 14 within the tube 11 and each of the pockets 10 communicates openly with this air chamber 14.

With this construction, it will be obvious that when the inner tube 11 is inflated within the tire, its outer and side walls will assume the pocket-like formation of the fabric, due to the cords 7, and these cords being firmly attached about the beads of the tire, easily sustain the outward pressure of the inflated inner tube. The pockets 10 are semi-circular in shape laterally of the tire as clearly shown in Figures 1 and 2 and likewise have a tendency to bulge outwardly at the sides as at 15 in Figure 3. This provides a large area of air space within the tire corresponding in shape to the "balloon" type of tire.

The outer surface of the pocket shaped fabric tire wall just described, is provided with heavy rubber tread members 16 vulcanized or otherwise suitably secured to the outer surface of each pocket member. These tread members may take any desired configuration on their outer surface for nonskid purposes, the same as treads of the well-known types now in use.

Each of the tread members 16 is preferably entirely separate from the adjacent tread member and is carried solely by the outer surface of the pocket member 10 formed by the fabric 1 and maintained in such form by means of the cords 7.

The result of this construction is that when the tire strikes an obstruction in the road, such as illustrated at 17 in Figure 1, only that portion of the tire, namely the pocket or pockets which engage directly with the obstruction, are displaced. This limits the "lifting" surface of the tire, to the pockets affected, and as each is individually compressible it will be seen that instead of a large stiff surface area being displaced and affecting the wheel 18, upon which the tire is mounted, the tire will roll over such obstruction without appreciably affecting the wheel. The air displacement, also is individual with each pocket 10 and these pockets openly communicating with the large air chamber 14 evenly distribute the displacement over a maximum area.

The same action is apparent when several of the air pockets are simultaneously displaced as by very large obstruction or by the weight of the vehicle carried by the tires. This is also illustrated clearly in Figure 1.

Each pocket 10 is in itself a cushion and may be independently displaced without affecting the adjacent pockets. The pressure of the air within the tire naturally and normally holds the pockets outwardly and forces them to normal position promptly as the obstruction which has displaced them is removed or passed over.

My invention, therefore, is to be limited only by the appended claims.

I claim:—

1. A pneumatic tire comprising a circular casing of flexible material, means secured laterally around said material at spaced intervals and drawing said material inwardly to form permanently communicating pockets, an inflatable tube in said casing conforming to the inner surface of said pockets when inflated whereby compressible cushions are provided, and tread members on the outer surface of said pockets.

2. A pneumatic tire comprising a circular casing of flexible material having free edges, tie members secured to said free edges of said casing and engaging around the outer walls thereof at spaced intervals, said tie members drawing said outer walls inwardly for a portion of the depth of the casing to form a series of pockets about the casing, an inflatable tube in the casing conforming to the inner surface thereof when inflated, and tread members on the outer surface of said pockets, whereby cushions are provided around said casing.

3. A pneumatic tire comprising a circular casing provided with a series of compressible air pockets in circumferential succession, a relatively large air chamber in such casing permanently communicating with such pockets, and an inflatable inner tube lining the inner walls of said casing and pockets.

4. A pneumatic tire comprising a circular casing of flexible material, the outer wall of said material being formed inwardly at spaced intervals about the casing in circumferential succession to provide a series of pockets, an air chamber in said casing between said pockets and the inner side of said casing, said pockets permanently opening into said chamber, an inflatable tube in said casing adapted to conform to the inner surface of said pockets when inflated, and a tread on the outer surface of said pockets.

CHARLES B. WOODWORTH.